Figure 1:
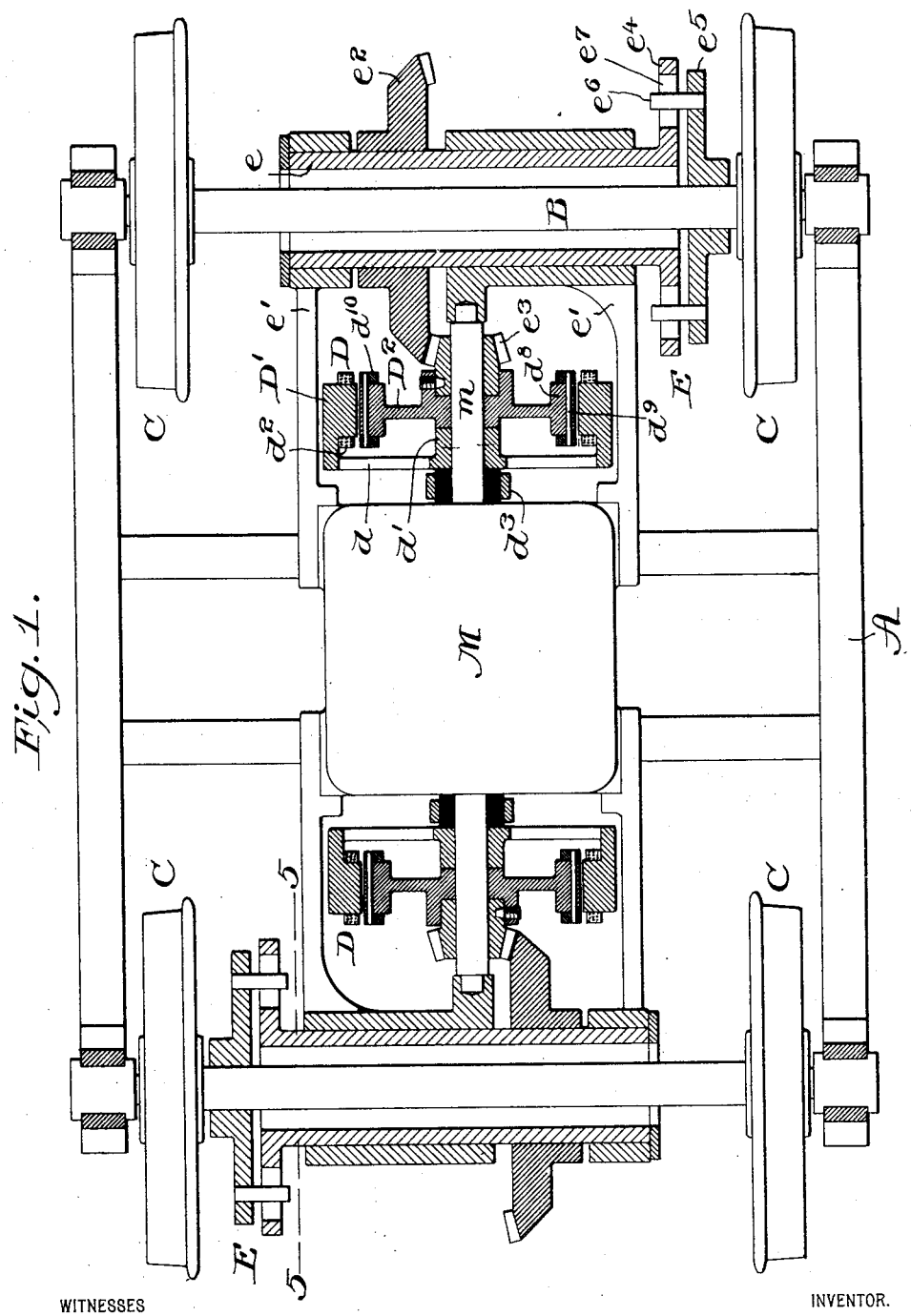

No. 686,768. Patented Nov. 19, 1901.
G. J. SCOTT.
SYSTEM OF ELECTRICAL PROPULSION FOR RAILWAY OR OTHER CARS.
(Application filed Mar. 8, 1901.)
(No Model.) 3 Sheets—Sheet 1.

WITNESSES
A. V. Group
S. Nolan

INVENTOR
BY Gordon John Scott
John R. Nolan
ATTORNEY.

No. 686,768. Patented Nov. 19, 1901.
G. J. SCOTT.
SYSTEM OF ELECTRICAL PROPULSION FOR RAILWAY OR OTHER CARS.
(Application filed Mar. 8, 1901.)
(No Model.) 3 Sheets—Sheet 2.
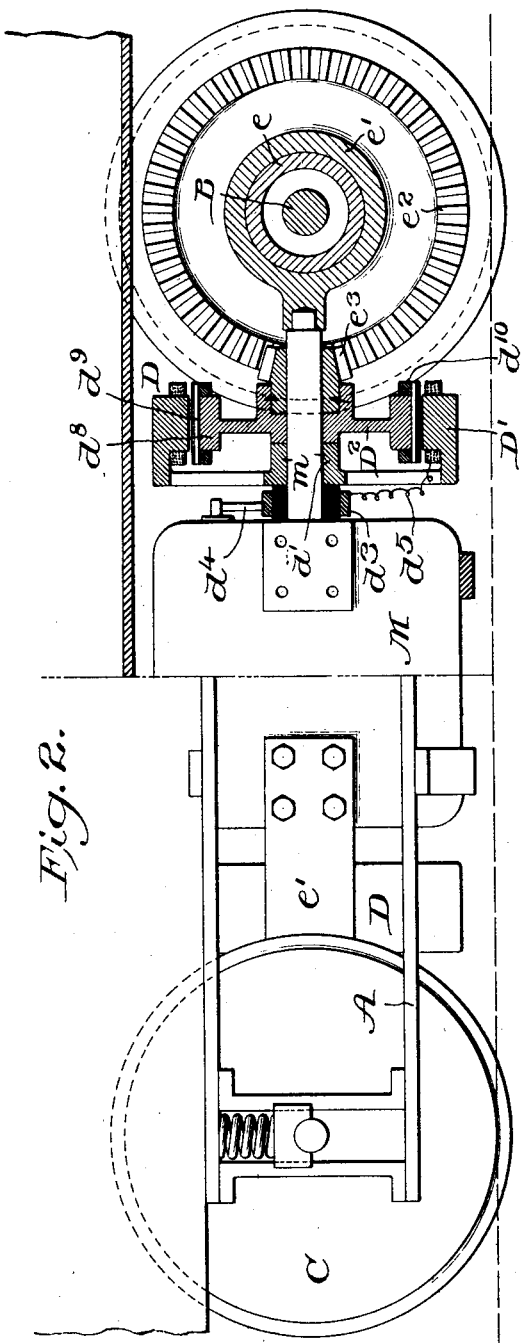
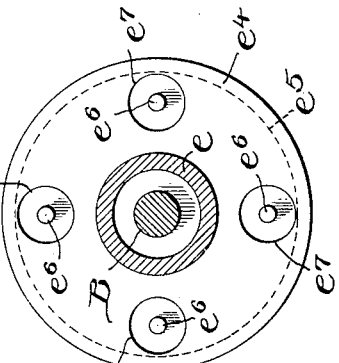
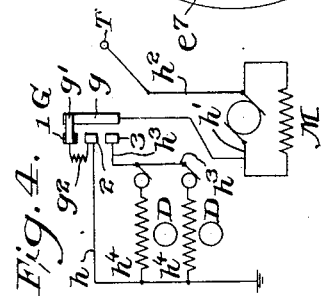
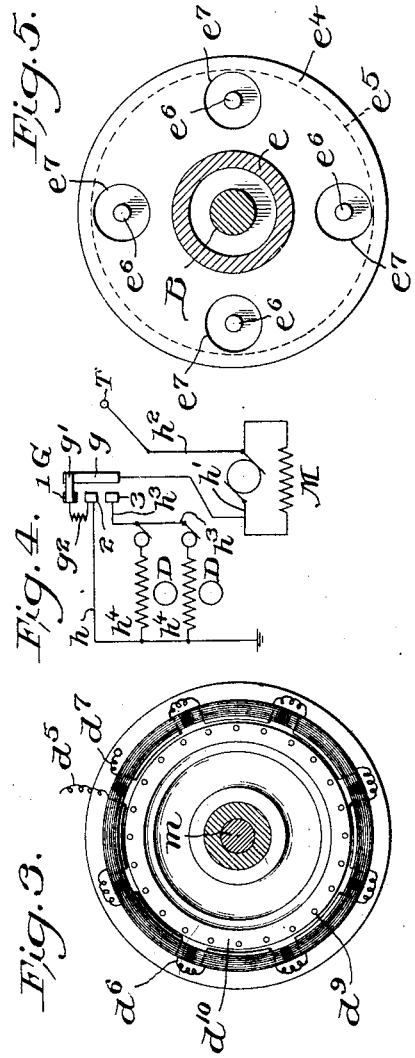
WITNESSES:
INVENTOR
Gordon John Scott
BY
John F. Nolan
ATTORNEY.
THE NORRIS PETERS CO., PHOTO-LITHO., WASHINGTON, D. C.

No. 686,768. Patented Nov. 19, 1901.
G. J. SCOTT.
SYSTEM OF ELECTRICAL PROPULSION FOR RAILWAY OR OTHER CARS.
(Application filed Mar. 8, 1901.)
(No Model.) 3 Sheets—Sheet 3.
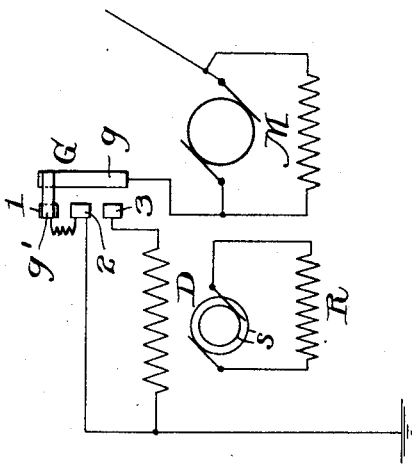
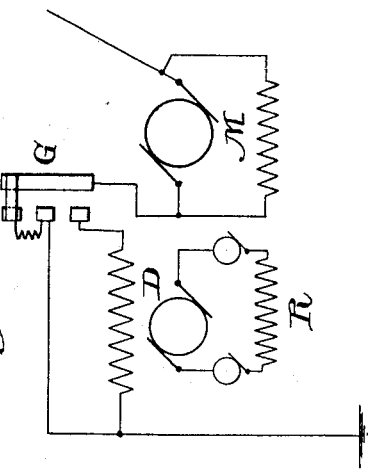
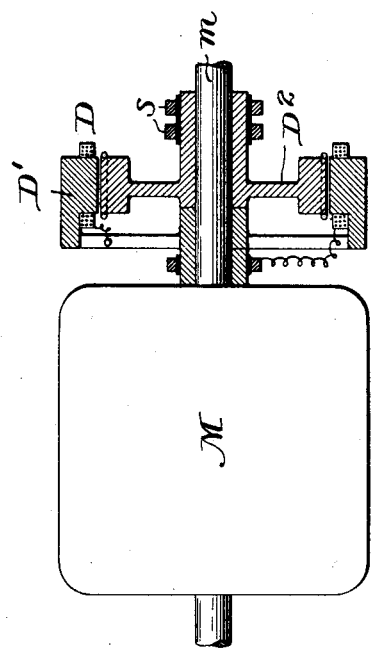
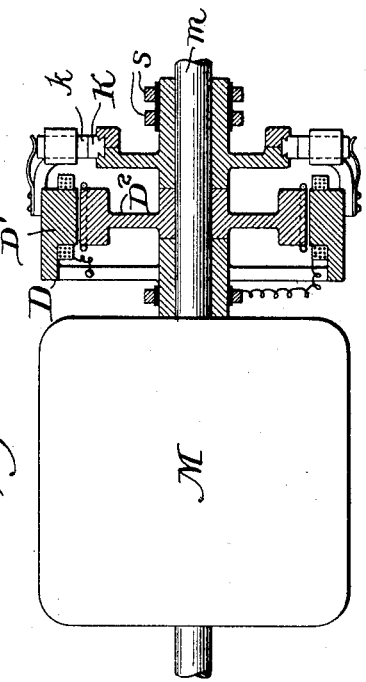
WITNESSES:
INVENTOR
Gordon John Scott
BY
ATTORNEY

UNITED STATES PATENT OFFICE.

GORDON JOHN SCOTT, OF PHILADELPHIA, PENNSYLVANIA, ASSIGNOR OF ONE-HALF TO WILLIAM S. JANNEY, OF PHILADELPHIA, PENNSYLVANIA.

SYSTEM OF ELECTRICAL PROPULSION FOR RAILWAY OR OTHER CARS.

SPECIFICATION forming part of Letters Patent No. 686,768, dated November 19, 1901.

Application filed March 8, 1901. Serial No. 50,307. (No model.)

*To all whom it may concern:*

Be it known that I, GORDON JOHN SCOTT, a citizen of the United States, residing in the city and county of Philadelphia, in the State of Pennsylvania, have invented certain new and useful Improvements in Systems of Electrical Propulsion for Railway or other Cars, of which the following is a full, clear, and exact description, reference being had to the accompanying drawings, forming a part of this specification.

This invention relates to a system of electrical propulsion for railway and other cars and for other purposes.

The primary object of my invention is to combine with an electric motor a separately-excited dynamo in which the field-magnets are energized by the same current that operates the motor and in which the magnetic coils are connected in series with the motor or cut-out of circuit without in either case interfering with or interrupting the continuous flow of current through the motor.

A further object of my invention is to interpose between the dynamo and the mechanism to be driven thereby a novel power-transmitting device which will permit the said mechanism to play freely in any direction within limits to insure the requisite cushioning effect upon the dynamo and motor without the use of special spring connections.

Further objects of my invention will hereinafter appear.

In the drawings, Figure 1 is a plan of a car-truck in which my invention is embodied, the dynamos and the coupling devices between the same and the respective axles of the car being shown in section. Fig. 2 is a side elevation, partly in section, of the said truck and the actuating mechanism therefor, part of the car-body being shown. Fig. 3 is an end view of one of the dynamos, showing the motor-shaft in transverse section. Fig. 4 is a diagram of the electrical connections. Fig. 5 is a sectional detail of one of the coupling devices as on the line 5 5 of Fig. 1. Figs. 6 and 7 are sectional elevations of modifications hereinafter described. Figs. 6ª and 7ª are diagrams of the electrical connections of said modifications, respectively.

A is the truck, B B the axles, and C C the wheels. Mounted on the truck intermediate the axles is a shunt or compound wound electric motor M, which is operatively connected with the respective axles through the medium of dynamos D and interposed mechanical drivers or coupling devices E. Each of the dynamos is so constructed and arranged that its field-coils may be thrown into and out of circuit with a series connection in which the the motor is included, and the mechanical driver or coupling device is so constructed and arranged that not only is the power efficiently transmitted thereby from the dynamo to the axle, but the latter is permitted to play freely in any direction within limits in a manner to insure the requisite cushioning effect upon the motor without the otherwise necessity of using special spring connections.

The electrical connections are indicated in the diagram in Fig. 4 as follows: G is a switch including in its construction three insulated contact-clips 1, 2, and 3 and an elongated strip $g$ adjacent thereto, together with a movable contact $g'$, adapted to be moved along the strip, so as to make and break electrical connection between the same and any of the clips 1 2 3. The clips 1 and 2 are connected by a small resistance $g^2$, the latter clip being connected with the ground by a conductor $h$. The strip $g$ is connected with the conductor $h'$, leading from the armature-coils of the motor, such coils being connected, by means of a conductor $h^2$, with the main or supply conductor through the instrumentality of a trolley-wheel T, for instance. The conductor $h^2$ is also connected with the field of the motor, and the field, in turn, is connected with the strip $g$, as indicated. Leading from the contact 3 is a conductor $h^3$, which is electrically connected with the field-coils of the respective dynamos D, the return-conductor $h^4$ from the latter being grounded. Hence if the contact $g'$ be moved to make connection between the strip $g$ and the clip 1 a circuit will be established through the resistance in series with the motor. The free operation of the latter will thus be effected. If such contact then be moved from clip 1 to and upon clip 2, the resistance will be cut out and the motor will be driven at full speed. If the contact next be moved to make connection between the strip and clip 3, the current will pass through the circuit in which the two dynamos are included, thereby effecting the operation of the dynamos, and, perforce, the propulsion of the car, all as will be hereinafter fully set forth.

As the motor employed may be of any approved compound or shunt-wound type, no detailed description thereof is necessary. It is preferably mounted on the truck, with the motor-shaft $m$ at right angles to and operatively connected with the respective axles. There are thus interposed between each end of the motor and the adjacent axle a dynamo D and a coupling device E.

Referring to the dynamo, $D'$ and $D^2$ are the field-magnets and armature, respectively, mounted on the shaft $m$ of the motor. The field-magnets comprise a ring, of iron or other magnetic metal, rigidly connected to the motor-shaft by arms $d$ and hub $d'$. Suitably disposed on the inner periphery of the ring are the cores of several electromagnets, which cores are each surrounded by a coil of wire $d^2$, so arranged and connected that when a current of electricity is passed through the coils by proper manipulation of the switch G the cores are magnetized by the total current of the motor.

$d^3$ is a conductor-ring affixed concentric to but insulated from the shaft $m$. Upon this ring bears a contact-brush $d^4$, which is electrically connected with the conductor leading from the contact 3 of the switch. Leading from the ring to one of the field-coils $d^2$ is a conductor $d^5$, and this coil in turn is connected to the next adjacent coil by a conductor $d^6$, and the second coil likewise to the third, and so on throughout the series, the last coil $d^7$ being connected to the dynamo-frame and grounded.

The armature of the dynamo comprises a ring $d^8$, of iron or other magnetic material, loosely mounted on the shaft $m$. This ring carries a number of electrical conductors $d^9$, fixed about its periphery and arranged and connected to be occupied by electric currents set up by relative motion between the field and armature. As shown in the drawings, the conductors are in the form of rods extending from side to side of the ring and connected successively by a laterally-disposed metal annulus $d^{10}$, and thereby short-circuited.

It will be observed that the two rotatable members of the dynamo are concentric with the axis of the motor-shaft and that the outer surface of the armature is concentric to, but out of mechanical contact with, the inner face of the field-magnets, the intervening space being preferably very thin.

Now, assuming the motor-shaft to be revolving and the electric circuit in which the clip 3 is included to be completed by the proper manipulation of the switch G, as above described, the rotating field-magnets of the dynamo will be energized, and such magnets will travel mechanically past the conductors of the armature of the dynamo. Hence currents of electricity will be set up in the armature-conductors and will react upon the magnetic poles of the field. As the current admitted to the dynamo field-coils is greater or less the magnetic induction is greater or less and the driving force exerted by the field upon the armature is correspondingly greater or less.

By the foregoing-described construction it will be seen that the armature of the dynamo is short-circuited upon itself and that said dynamo is a separately-excited machine in which the field-magnets are energized by the same current that operates the motor and in which the magnet-coils are connected in series with the motor or cut out of circuit (as may be desired to move or stop the car) without in either case interfering with or interrupting the continuous flow of current through the motor.

With the arrangement of series connections above explained the operation is as follows: The motor being up to speed across the line and all unnecessary resistance being cut out, the motor is said to be running free or unloaded. Upon the switch being moved to contact 3 the current passing through the motor-armature also passes through the field-magnet coils of the dynamos. At the moment of passing the current (which is small in volume) through the said coils the magnets are energized, and inasmuch as there is relative motion between the complementary fields and armatures (as in all dynamos) currents are set up in the armature-windings and react upon the field-magnets. This reaction entails more work upon the motor, which in consequence decreases its electromotive force and takes more current from the line. The growing current energizes more powerfully the field-magnets of the dynamos, which again demand more work from the motor, and again the current is increased until that value of current is reached that provides the torque requisite to start the car. Thus the car starts very smoothly and rapidly accelerates its speed.

It will be seen that the dynamos are dependent upon the motor, because they all depend upon the same current and are compelled to start slowly and as the current increases to accelerate the speed of the apparatus to which they are connected mechanically.

In Figs. 6 and 6ª of the drawings I have shown a slight modification in the connections of the dynamo, in which the armature instead of being short-circuited upon itself, as in the construction above described, is short-circuited through resistances R or other translating devices (such as supplementary motors, &c.) and in which the said armature is provided with slip-rings $s$, electrically connected with such devices so as to deliver an alternating current to the latter. In Figs. 7 and 7ª of the drawings I have illustrated a similar modification with the addition of a commutator K on the dynamo-armature, brushes $k$ for said commutator carried by the dynamo field-magnets, and connections between said brushes and the slip-rings $s$, with which translating devices R (which may be storage batteries) are connected, whereby a direct current may be delivered to such devices.

Referring to the mechanical connection or coupling device E between each of the dynamos and the driving-axle of the car, $e$ represents a sleeve, which, encircling the axle, is supported by bearings on arms or brackets $e'$, extending from the casing of the motor. Fast on this sleeve is a gear $e^2$, the teeth of which coact with those of a pinion $e^3$, loosely mounted on the motor-shaft and keyed or otherwise rigidly connected with the hub of the armature of the dynamo, whereby the motion is transmitted from the latter to the gear $e^2$ and sleeve $e$. On one end of this sleeve is a flange or ring $e^4$, that lies laterally adjacent to a head or disk $e^5$, fast on the axle. Such head or disk is provided with a series of lateral projections $e^6$, which extend into a corresponding series of circular spaces or orifices $e^7$ in the flange or ring $e^4$. These spaces or orifices are larger in diameter than the projections and are so disposed relatively thereto that the projections simultaneously and continuously bear against the opposing parts of the ring or flange $e^4$ irrespective of the position of adjustment within limits. Hence during the rotation of the sleeve $e$ the ring or flange thereon, bearing upon the projections of the head or disk, positively and uniformly revolve the latter, and, perforce, the driving-axle. It will thus be seen that the axle is permitted to play freely in any direction within limits, thereby insuring the requisite cushioning effect upon the motor and dynamos without the otherwise necessity of using special spring connections between said driving devices and the axle or between said devices and the truck. (Of course the usual spring connections between the car-body and the axle-boxes are employed.) During the periods of vibration of the car-body relative to the truck or of the car-wheels and their axles the projections $e^6$ on the head or disk $e^5$ move freely in and against the opposing curved walls of the respective spaces $e^7$ of the flange or ring $e^4$, thereby obviating all shock or jar to the motor and dynamos.

I claim—

1. In combination with an electric motor, a dynamo mounted on the shaft thereof, one member of the dynamo being fast and the other member loose on said shaft, and means for connecting the field-magnet coils of the dynamo in series with the motor-coils and for disconnecting the same, without in either case interrupting the current passing through the motor.

2. In combination with an electric motor, a dynamo mounted on the shaft thereof, one member of the dynamo being fast and the other member loose on said shaft, means for connecting the field-magnet coils of the dynamo in series with the motor-coils and for disconnecting the same, without in either case interrupting the current passing through the motor, a driven member, and connections between the same and the said loosely-mounted member of the dynamo.

3. In a system of electrical propulsion for railway and other cars, a motor, a dynamo comprising two relatively movable members one of which is connected with the motor and the other of which is connected with the portion of the car to be driven, a series connection in which the motor and the field-magnets of the dynamo are included, and a switch with connections whereby the motor may be independently thrown into circuit and whereby the said field-magnets may thereafter be thrown into circuit with the motor, substantially as described.

4. In a system of electrical propulsion for railway and other cars, a motor, a dynamo comprising two relatively movable members, one of which is connected with the motor, a yielding coupling or transmitting device between the other member and the portion of the car to be driven, a series connection in which the motor and the field-magnets of the dynamo are included, and a switch with connections whereby the motor may be independently thrown into circuit, and whereby the said field-magnets may thereafter be thrown into circuit with the motor.

5. In a system of electrical propulsion for railway and other cars, the combination with the driving-axles, of a motor mounted between the same, dynamos arranged adjacent to the respective ends of the motor, each of said dynamos comprising two relatively movable members one of which is connected with the adjacent end of the motor, and the other of which members is connected with the adjacent axle of the car, a series connection in which the motor and the field-magnets of the respective dynamos are included, and a switch with connections whereby the motor may be independently thrown into circuit, and whereby the said field-magnets may thereafter be thrown into circuit with the motor.

6. In a system of electrical propulsion for railway and other cars, a motor, a dynamo comprising two relatively movable members whereby one is connected with the motor and the other with the portion of the car to be driven, a series connection in which the motor and the field-magnets of the dynamo are included, and a switch having contacts 1, 2 and 3, a common contact, and a movable contact, the common contact being electrically connected with the said motor, contact 3 being connected with the said magnets, contacts 1 and 2 being connected by a resistance, and contact 2 being connected with the ground or negative side of the line; whereby when the movable contact is moved onto contact 1 or 2, the motor is thrown into circuit, and when it is moved onto contact 3, the field-magnets of the dynamo are included in the circuit with the motor.

7. In a motor-car, the combination with the driving-axle, a rotatable member loosely encircling the same, and a rotatable member fast on the axle, one of said members being provided with lateral projections and the other with circular orifices into which said projections freely extend, of a motor, and connections between the same and the member first named.

In testimony whereof I have hereunto affixed my signature in the presence of two subscribing witnesses.

GORDON JOHN SCOTT.

Witnesses:
JOHN R. NOLAN,
ANDREW V. GROUPE.